United States Patent [19]

Erickson et al.

[11] Patent Number: 5,511,302
[45] Date of Patent: Apr. 30, 1996

[54] METHOD OF PRODUCING A TAPE GUIDE FOR A DATA CARTRIDGE

[75] Inventors: Leif O. Erickson, River Falls, Wis.; Jay J. Iqnaszewski, Woodbury; David D. Madsen, Lakeland, both of Minn.

[73] Assignee: Minnesota Mining and Manufacturing Company, St. Paul, Minn.

[21] Appl. No.: 290,531

[22] Filed: Aug. 15, 1994

Related U.S. Application Data

[62] Division of Ser. No. 86,322, Jul. 1, 1993, Pat. No. 5,377,927.

[51] Int. Cl.$^6$ .............................. B23P 11/00; B21D 28/02
[52] U.S. Cl. ................. 29/521; 29/434; 29/806; 29/895.3
[58] Field of Search ............................ 29/434, 437, 438, 29/521, 806, DIG. 3, DIG. 32, DIG. 37, 895.2, 895.21, 895.3; 72/365.2, 379.2; 226/196; 242/346

[56] References Cited

U.S. PATENT DOCUMENTS

| | | | |
|---|---|---|---|
| 3,588,346 | 6/1971 | Ramig, Jr. | 242/615.3 |
| 3,692,255 | 9/1972 | Von Behren | 242/343.2 |
| 3,831,882 | 8/1974 | Fitterer et al. | 242/346 |
| 3,984,039 | 10/1976 | Hawley et al. | 226/196 X |
| 3,991,956 | 11/1976 | Machida | 226/196 X |
| 4,024,622 | 5/1977 | Feinberg et al. | 29/DIG. 3 X |
| 4,305,536 | 12/1981 | Burdorf et al. | 226/196 X |
| 4,330,925 | 5/1982 | Kato et al. | 29/806 X |
| 4,491,891 | 1/1985 | Shiba | 242/346.2 |
| 4,686,597 | 8/1987 | Johnston | 360/130.23 |
| 4,736,904 | 4/1988 | Schoettle et al. | 242/346 X |
| 4,754,908 | 7/1988 | Tanaka et al. | 72/368 X |
| 5,104,058 | 4/1992 | Eggebeen | 242/346 |
| 5,157,833 | 10/1992 | Kohama et al. | 29/895.3 X |
| 5,251,844 | 10/1993 | Albrecht et al. | 226/198 X |
| 5,289,331 | 2/1994 | Eaton et al. | 226/196 X |

FOREIGN PATENT DOCUMENTS

| | | |
|---|---|---|
| 0274197A2 | 7/1988 | European Pat. Off. . |
| 0536912A2 | 4/1993 | European Pat. Off. . |
| 3211227A1 | 9/1983 | Germany . |
| 493131 | 3/1992 | Japan ................... 29/806 |
| 2073142 | 10/1981 | United Kingdom . |
| WO92/15989 | 9/1992 | WIPO . |
| WO93/03484 | 2/1993 | WIPO . |

*Primary Examiner*—Peter Vo
*Attorney, Agent, or Firm*—Gary L. Griswold; Walter N. Kirn; Charles D. Levine

[57] ABSTRACT

A reel-to-reel tape cartridge includes two tape guides for guiding the tape to and from respective tape reels. The tape guides have a large radius of curvature and are flanged to form a long trough to guide and align the tape to improve tape tracking. The tape guides are formed of two flange pieces separated by a tape surface piece and a post. Each flange piece is generally semi-circular and includes three notches which receive tabs on the tape surface piece to secure the tape surface piece. The tape surface piece is formed as a type of leaf spring that is loaded when it is assembled between the flange pieces. The post can be cylindrical or flat.

8 Claims, 5 Drawing Sheets

METHOD OF PRODUCING A TAPE GUIDE FOR A DATA CARTRIDGE

This is a division of application Ser. No. 08/086,322 filed Jul. 1, 1993 now U.S. Pat. No. 5,377,927.

TECHNICAL FIELD

The present invention is directed to tape guides for guiding the tape in a reel-to-reel data tape cartridge. More particularly, the present invention relates to tape guides which improve tape tracking and reduce the required drive force.

BACKGROUND OF THE INVENTION

The belt-driven data tape cartridge of Von Behren, U.S. Pat. No. 3,692,255 has become a standard interface with computers where rapid acceleration and deceleration of the tape are required. In these reel-to-reel tape cartridges, an elastic driving belt extends along a belt path around corner guide rollers positioned adjacent the tape reels, contacts the tape on the reels, and drives the tape from reel to reel. A tape path extends between the reels and along one edge of the cartridge across a cutaway portion providing access to the tape by a transducer such as a magnetic read/write head which is a part of a tape drive which receives the cartridge. The tape path is defined by a guide pin, a pair of tape guides, and in some cartridges, a pair of tape wrap pins. One tape wrap pin is positioned between each reel and the adjacent tape guide to deflect the tape from a straight line path between the tape supply on the reel and the tape guide. This increases the frictional coupling between the tape and the tape wrap pin as the amount of tape wound on the reel increases and helps to maintain constant tape tension at the magnetic head.

Belt driven tape cartridges must meet minimum tape tension specifications while simultaneously maintaining minimum drive force specifications. The tape tension must not fall below a certain level as the tape passes from reel to reel or contact between the read/write head and the tape will be insufficient. The minimum achievable tape tension should be sufficiently high to ensure proper cartridge operation. Similarly, the maximum required frictional drive force should be as low as possible to enhance cartridge operation within the power limitations of the drive motor. Thus, there is a limitation on the frictional drive force. The frictional drive force is that portion of the drive force which affects power loss at the interface between the tape backside and the tape guide. There is a continuing need to further minimize the frictional drive force and to improve tape tracking thereby to further enhance cartridge operation. This can be accomplished by minimizing the friction at the interface between the tape and the tape guides, which accounts for approximately one-third of the drive force in a data cartridge.

Early tape guides were made of a plurality of separate components staked together by a rivet. Upper and lower flanges or washers were fastened on the ends of a tape guide spacer. However, this system of assembly was subject to imprecise operation over time. The riveting did not adequately maintain the integrity of the assembly to a degree required by the current generation data tape cartridges.

Injection molded plastic parts, while mass producible, do not guarantee durability, nonshedding, holding tight tolerances, or maintaining rigidity during use. Additionally, static build-up and dust collection are associated with dielectrics.

The current generation tape guides are made of a single piece of material that is machined, ground, or cast, from a solid mass, such as non-magnetic stainless steel. This single piece construction requires that the tape guide be machined to form accurately the distance between the flanges and the overall part. Using stainless steel as a material for precision tape guides has resulted in expensive parts, due to the limited number of methods available for working stainless steel.

SUMMARY OF THE INVENTION

A belt-driven, reel-to-reel magnetic tape data cartridge according to the present invention includes large radius, tape guides. The tape guides can have a constant or varying radius and produce the effect of a long trough to steer, guide, and align the magnetic tape and damp out the undesirable effects due to the eccentricity of the tape hubs before the tape passes the read/write head to improve tape tracking. The larger radius could also assist hydrodynamic lift to reduce the friction between the tape backside and the tape guide, which accounts for about one-third of the drive force in the data cartridge. The tape guides direct and align the tape to improve tape tracking and provide clearance for the tape without an interference fit and could hydrodynamically lift the tape without any external fluid supply to reduce the friction between the tape backside and the tape guide.

Each tape guide has a bearing surface and includes top and bottom flange pieces, a tape surface piece, and a post. The two flange pieces are separated by the tape surface piece and the post and form flanges bordering the tape surface piece. The tape surface piece fixes the distance between the flange pieces and maintains the flange piece surfaces parallel. The post mounts the tape guide to the base plate. The tape guide is configured to prevent rotation around the axis of the post.

The tape surface piece is curved and forms the tape bearing surface with a trough. When assembled onto the tape guide, the tape surface piece forms a surface having a side profile substantially identical to the curvature of the flange pieces. Three notches formed on each flange piece, one adjacent each interface of the curved side and the straight side, and one generally at the center of the curved side. Three pairs of tabs project out of the tape surface piece and are received in respective notches in the flange pieces when the tape guide is assembled. The tape surface piece acts as a type of leaf spring that is loaded when it is assembled between the flange pieces and is bent against its internal biasing force when assembled to secure the tape surface piece between the flange pieces.

DETAILED DESCRIPTION OF PREFERRED EMBODIMENTS

Figure 1:
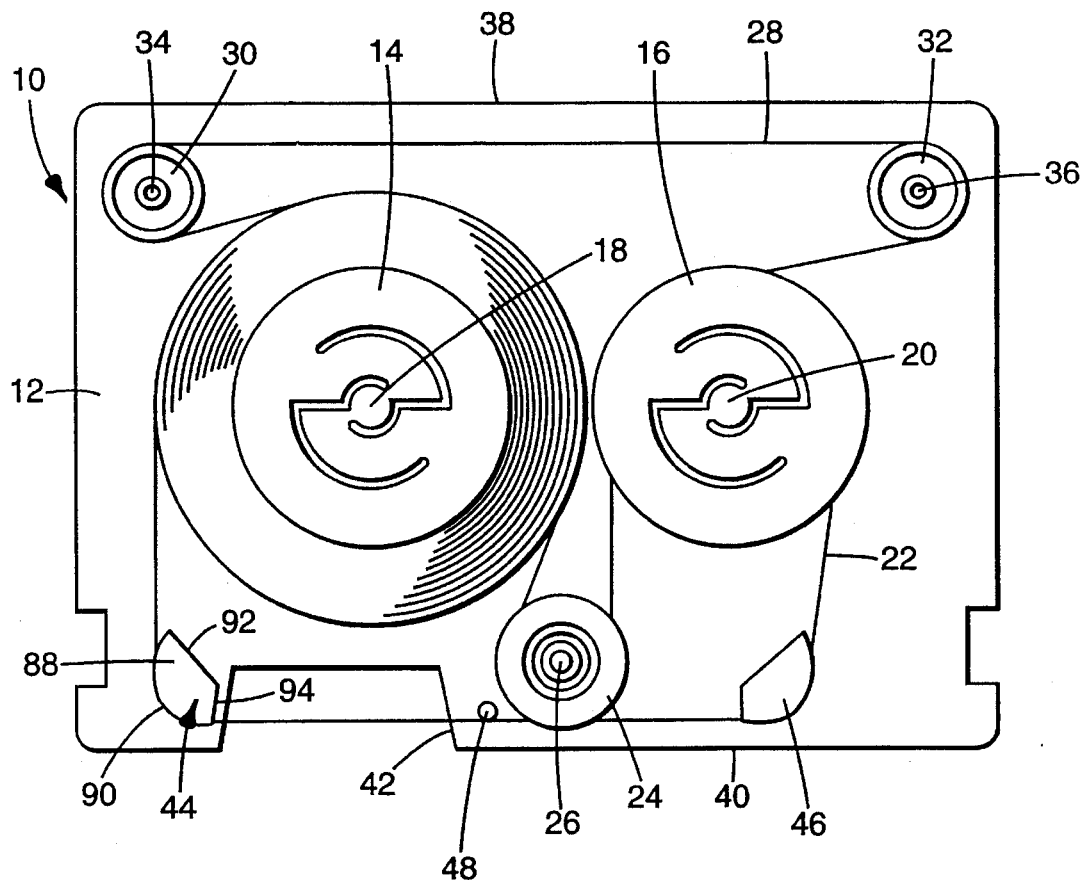
FIG. 1 is a top view of a belt driven data tape cartridge with the cover removed incorporating tape guides according to the present invention.

The drawings illustrate a data cartridge used in a recording and/or reproducing machine, known as a tape drive (not shown). The tape drive typically includes a support frame including a horizontal cartridge support deck which supports a magnetic transducer or recording head, and in a depending manner, supports a reversible drive motor. The shaft of the drive motor extends through and carries a drive roller above the support deck. Guides position the cartridge on the support deck. FIG. 1 illustrates a top view of a tape cartridge having tape guides according to the present invention. The cartridge 10 is a thin generally rectangular enclosure.

As shown in FIG. 1, the cartridge 10 includes a base plate 12 and a cover (not shown). Two tape reels 14, 16 are mounted for rotation on respective tape reel pins 18, 20 pressed into the base plate 12, within the cartridge 10. The magnetic tape 22 is driven from reel to reel via a drive system including a drive roller 24 which is mounted for free rotation on a drive roller pin 26. The drive roller 24 drives a driving belt 28 which winds around corner guide rollers 30, 32 and the tape reels 14, 16. The guide rollers 30, 32 guide the driving belt 28 and are rotatably mounted on guide roller pivot pins 34, 36 mounted at opposite corners of the cartridge base plate 12 along a back edge wall 38 parallel to the front edge wall 40. The front edge wall 40 has a cutaway portion 42 for access to the magnetic tape 22 by the magnetic recording head. A door (not shown) closes the cutaway portion 42 when the cartridge 10 is not in use. An opening (not shown) extends into the front edge wall 40 to provide access for the drive roller of the tape drive.

The driving belt 28 is thin, continuous, flexible, and elastic. It extends along the belt path around the drive roller 24 and the corner guide rollers 30, 32 and contacts the tape 22 on the tape reels 14, 16. The unstretched length of the driving belt 28 is less than the length of the belt path. Thus, when the belt 28 is stretched around the guide path it generates a belt tension which provides a frictional engagement force or side load between the guide rollers 30, 32 and their respective pivot pins 34, 36 as well as between the belt 28 and the tape reels 14, 16. The frictional engagement force also presses the tape layers together to prevent slipping of adjacent tape layers wound on the tape reels 14, 16 and spilling of the tape 22 from the supply reel. Since the frictional engagement force is dependent on belt tension, the tape tension and drive force are dependent on the belt tension.

The guide rollers 30, 32 have a predetermined coefficient of friction to provide a predetermined frictional coupling between each guide roller 30, 32 and its pivot pin 34, 36. This frictional coupling applies a predetermined frictional drag to the driving belt 28 as it passes around the guide rollers 30, 32 to increase the tension of the belt 28 and provide the proper tension drop between the tape reels 14, 16.

The tape guides 44, 46 are also located on the base plate 12 and guide the magnetic tape 22 to and from respective tape reels 14, 16. A guide pin 48 is disposed on the base plate 12 intermediate the two tape guides 44, 46 and assists the tape guides 44, 46 in guiding the magnetic tape 22. No tape wrap pins are required although they can be used.

The tape 22 is convolutely wound on the tape reels 14, 16 in opposite directions. A tape guide path between the reels 14, 16 is defined by the tape guides 44, 46 and the tape guide pin 48. One tape guide 44 is positioned along the front edge wall 40 of the cartridge 10 on one side of the cutaway portion 42, and the other tape guide 46 and the guide pin 48, are positioned along the edge wall 40 on the opposite side of the cutaway portion 42.

Figure 4:
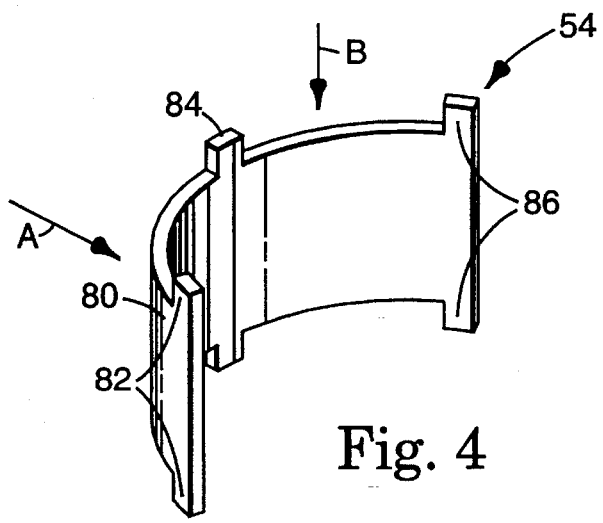
FIG. 4 is a perspective view of the tape surface piece of the tape guide of FIG. 3.
Figure 5:
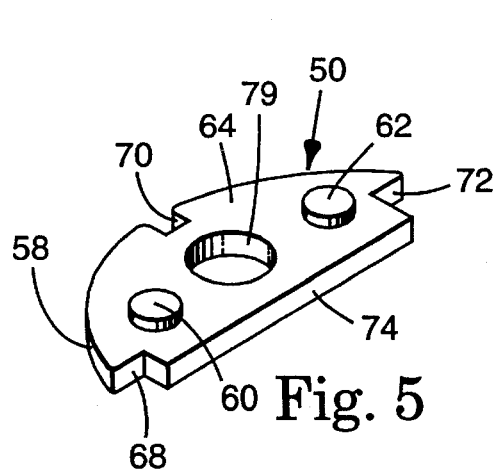
FIG. 5 is a perspective view of the flange piece of the tape guide of FIG. 3.
Figure 6:
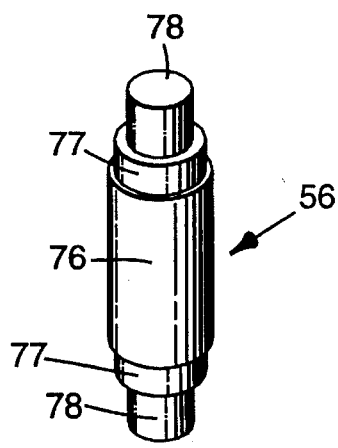
FIG. 6 is a perspective view of the post of the tape guide of FIG. 3.

The inventors have found that drawbacks to mass producing machined one-piece three-dimensional stainless steel tape guides are eliminated by using stamping or shearing technology and forming the tape guides of multiple components. Once the tooling is carefully accomplished, mass production is easy. Notwithstanding that conventional wisdom dictates that stamped or sheared metal parts are not adequate for very precise applications like cartridge tape guides, the inventors have recognized a property of a specific type and thickness of sheared metal parts that permits their use in precise applications. Referring to FIG. 4, when a force is applied in the direction indicated by A, the component can easily bend or form to create curves, angles, prestresses, or preforms for spring loading, as is described below. However, if a force is applied in the perpendicular direction indicated by B to the same piece, the rigidity of the piece in that plane can be used to fix positions, to hold tolerances, and to lock a spring. This approach was used as the guiding principle throughout the design of the stamped tape guide.

The tape guide 45, shown in FIGS. 3–8, is formed of several separate components. Top and bottom flange pieces 50, 52 are separated by a tape surface piece 54 and a post 56. The top flange piece 50 and the bottom flange piece 52 are not identical. Each flange piece 50, 52 is generally semi-circular and can have a constant radius curved side. In the illustrated embodiments, the curved side 58 has a varying radius.

Each flange piece 50, 52 is formed with two half-shears or buttons 60, 62. The bottom flange buttons 60, 62 position the tape guide 45 on the base plate 12 of the cartridge 10 and the top flange buttons 60, 62 position the tape guide 45 on assembly tools. The buttons 60, 62 on the top flange piece 50 project out of the top surface 64 of the flange piece 50 and the buttons 60, 62 on the lower flange piece 52 project out of the bottom surface 66 of the flange piece 52. The buttons 60, 62 on the lower flange piece 52 are received within openings in the base plate 12 to prevent rotation of the tape guide around the axis of the post 56. Additionally, each flange piece 50, 52 includes three notches 68, 70, 72, one adjacent each interface of the curved side 58 and a straight side 74 of the flange pieces, and one at the center of the curved side 58. The notches 68, 70, 72 secure the tape surface piece 54.

The post 56 is cylindrical and includes a larger diameter central portion 76 which is disposed between the flange pieces 50, 52 and two smaller diameter end portions 78 which extend through the hole 79 in the flange pieces 50, 52. An intermediate diameter portion 77 of the post 56 determines the height of the tape guide. The intermediate portions 77 and the end portions 78 of the post 56 are press fit through the holes 79 to improve the integrity of the assembly by maintaining the components of the assembled tape guide 45 in the required locations. The post 56 also is the main mounting component and mounts the tape guide 45 to the base plate 12 of the cartridge 10.

Figure 7:
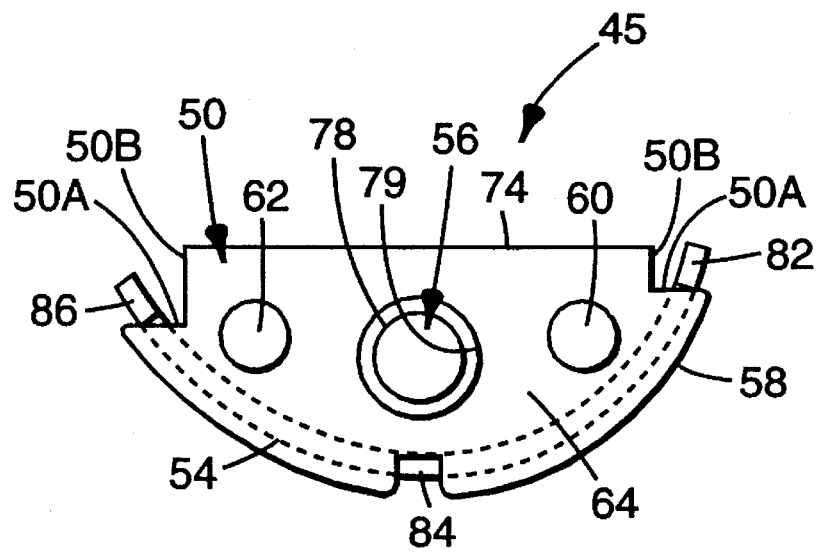
FIG. 7 is a top view of the tape guide of FIG. 3.

The tape surface piece 54 is curved and, when assembled onto the tape guide 45, forms a tape bearing surface 80 having a side profile which can be substantially identical to the curvature of the flange pieces 50, 52. Before it is formed with its curved shape, the tape surface piece 54 is generally rectangular with three pairs of tabs 82, 84, 86 projecting out of the rectangle. The tabs 82, 84, 86 are received in respective notches 68, 70, 72 in the flange pieces 50, 52 when the tape guide 45 is assembled. The tape surface piece 54 acts as a type of leaf spring that is loaded when it is assembled between the flange pieces 50, 52 and contacts the surfaces 50A of the flange piece 50, as shown in FIG. 7. Similarly, the tape surface piece 54 contacts the analogous surface of the flange piece 52. The tape surface piece 54 can be either underformed or overformed. In either instance, the tape surface piece 54 is bent against its internal biasing force when assembled to secure the tape surface piece 54 between the flange pieces 50, 52.

The lower tabs 82, 84, 86, can sit directly on the base plate 12 of the cartridge 10 to maintain the flanges parallel and to define the height of the tape guides. This also helps to maintain clearance between the bottom flange piece 52 and the base plate 12. This configuration loosens the precise manufacturing limits of the flange pieces 50, 52 and permits the flanges pieces to be less precisely made. Loading the flanges 50, 52 during assembly biases the bottom flange piece 52 toward the top flange piece 50, removes any imprecisions, and flattens the flanges.

Figure 3:
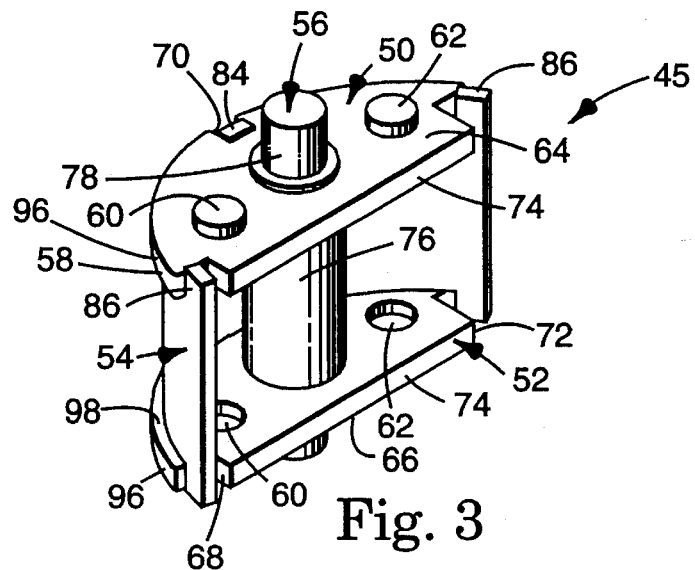
FIG. 3 is a perspective view of an alternative embodiment tape guide according to the present invention.
Figure 8:
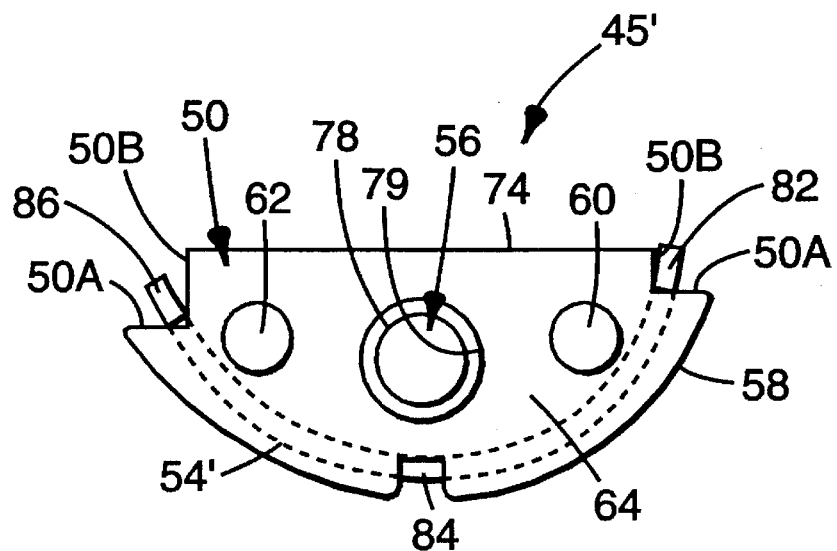
FIG. 8 is a top view of a tape guide according to another embodiment of the present invention.

As shown in FIG. 3, the bearing surface of the tape guide 45 can form flanges 96 which are formed from the flange pieces 50, 52 and which constrain and guide the tape 22 within a trough 98. As shown in FIG. 8, the tape surface piece 54 can be shaped to contact both surfaces 50A and 50B of the flange piece 50 when the tape surface piece 54 is bent to be secured between the flange pieces 50, 52. Also, the tape surface piece 54 can contact both surfaces of the flange piece 52.

The assembly of the tape guide 45 from its component pieces can be totally automated and is a variation of what is called "watch plate construction." That is, the top and bottom flange pieces 50, 52 are keyed together by the tape surface piece 54 via the interlocking of the tabs 82, 84, 86 and the notches 68, 70, 72. In this configuration, the components are formed by stamping while yielding the same accuracies as machining and grinding. This assembled tape guide 45 can be made and assembled for approximately one-half of the cost of the current one piece tape guides when made in large volumes.

Figure 9:
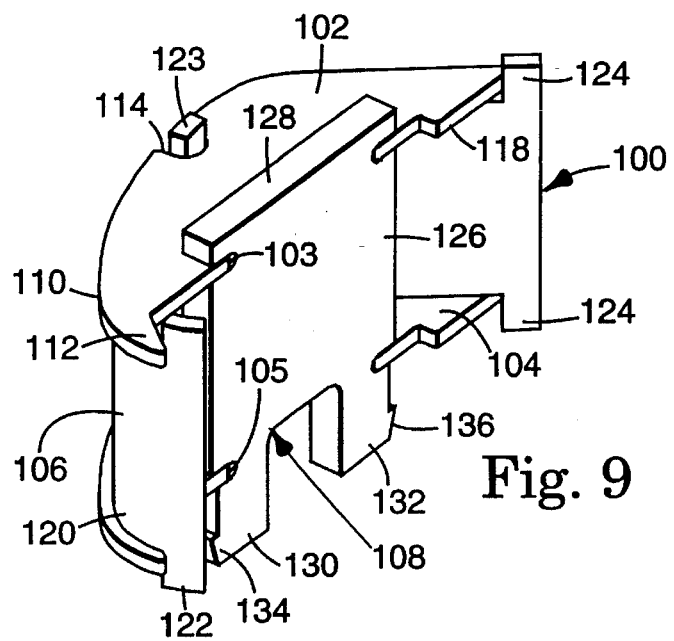
FIG. 9 is a perspective view of a tape guide according to another embodiment of the present invention.
Figure 10:
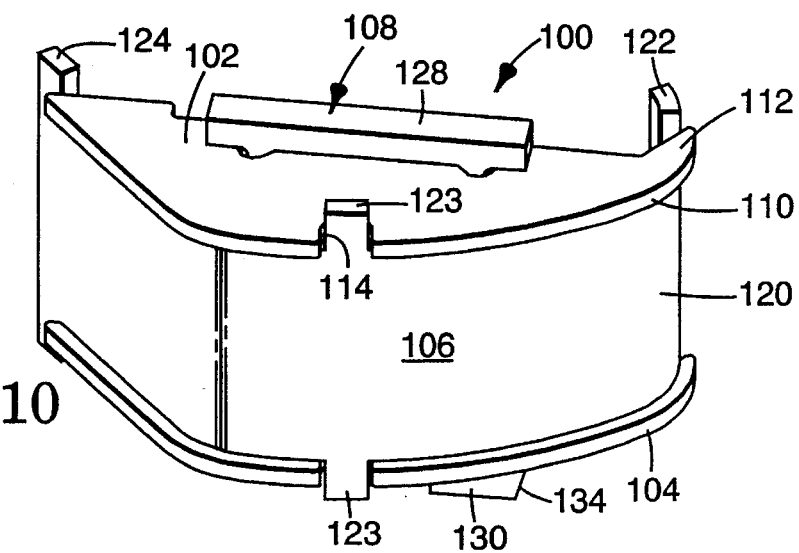
FIG. 10 is another perspective view of the tape guide of FIG. 9.
Figure 11:
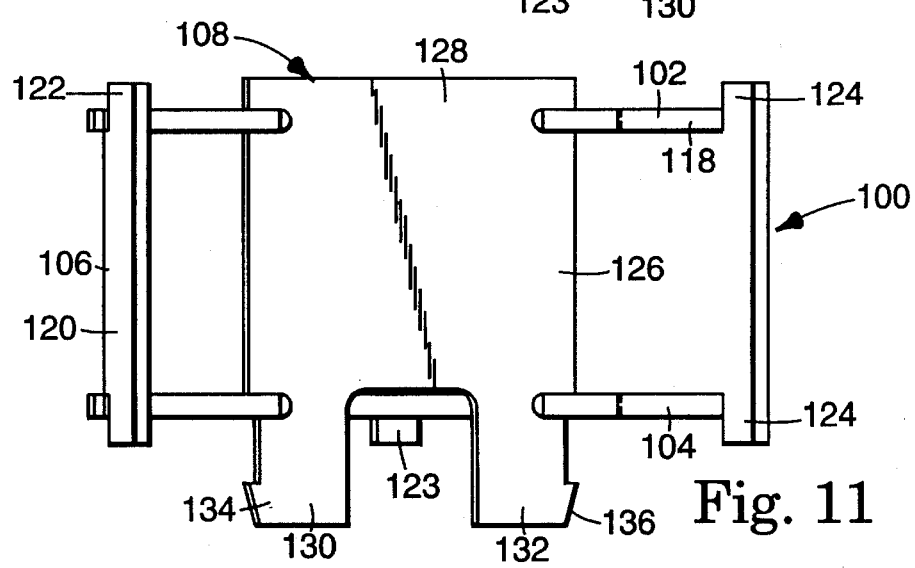
FIG. 11 is a side view of the tape guide of FIG. 9.

FIGS. 9–11 show an alternative embodiment of a tape guide 100 which also is formed of four separate components and is similar to the tape guide 45 of FIGS. 3–8 except as described differently below. Top and bottom flange pieces 102, 104 are separated by a tape surface piece 106 and a post 108. The top flange piece 102 and the bottom flange piece 104 are not identical. Each flange piece 102, 104 is generally semi-circular having a curved side 110 with a varying radius. Each flange piece 102, 104 includes an arm 112 and a notch 114. The notch 114 is at the center of the curved side 110. The arm 112 and the notch 114 secure the tape surface piece 106. The tape surface piece 106 includes tabs, 122, 123, 124.

The tab 122 is disposed against the arm 112 and the tab 123 is received in the notch 114. The tab 124 is disposed against the straight side 118 of the flange pieces 102, 104. Like the embodiments of FIGS. 3–8, the tape surface piece 106 serves as a tape bearing surface and is curved and, when assembled onto the tape guide 100, forms a surface 120 having a side profile which can be substantially identical to the curvature of the flange pieces 102, 104. Cutout portions 103, 105 can be formed in the top and bottom flange pieces 102, 104.

The post 108 is generally flat and extends for approximately half of the length of the straight side 118, although other lengths can be used. The post 108 includes a central portion 126 and can have an upper portion 128 which overlaps the top flange piece 102. The post 108 can have two sets of notches. The notches at the upper portion 128 of the post 108 and the upper portion 128 can be received in the cutout portion 103 of the top flange piece 102.

Two legs 130, 132 are formed at the bottom of the central portion 126 of the post 108 and each leg has a respective barb 134, 136 which, as shown, extends in a direction opposite the barb on the other leg and toward the respective outside of the tape guide 100. The notches at the legs 130, 132 of the post 108 and the legs 130, 132 can be received in the cutout portion 105 of the bottom flange piece 104. When the tape guide 100 is assembled into a data cartridge, the ends of the legs are received within one large or two smaller openings in the cartridge base plate 12 and the barbs dig into the side of the opening walls to secure the tape guide. The post 108 is the main mounting component and mounts the tape guide 100 to the base plate 12 of the cartridge 10. Additionally, the post 108 can be used as a carrier during assembly of the tape guide 100 to transport the assembled tape guide 100 to the location of the tape cartridge assembly.

When the tape guide 100 is assembled, the perpendicular distance along the flat post 108 between the flange pieces 102, 104 is less than the width of the tape surface piece 106. This causes the post 108 to spring load and lock the flange pieces 102, 104 in the vertical plane against the tape surface piece 106, to maintain contact between the tape surface piece 106 and the flange pieces 102, 104, and to set the distance between the flange pieces. The post 108 also prevents angular rotation of the tape guide 100 in the horizontal plane around the axis of the post, because the legs 130, 132 are disposed within one or more openings in the base plate 12.

Also, the tabs 122, 123, 124, like the tabs 82, 84, 86 of the tape guide 45, can be long enough to reach the surface of the base plate 12 when the tape guide is mounted in the cartridge. The tabs would then assist in maintaining the tape guide perpendicular with the base plate, in maintaining the height of the tape surface piece, and in preventing the tape guide from wobbling back and forth.

Figure 12:
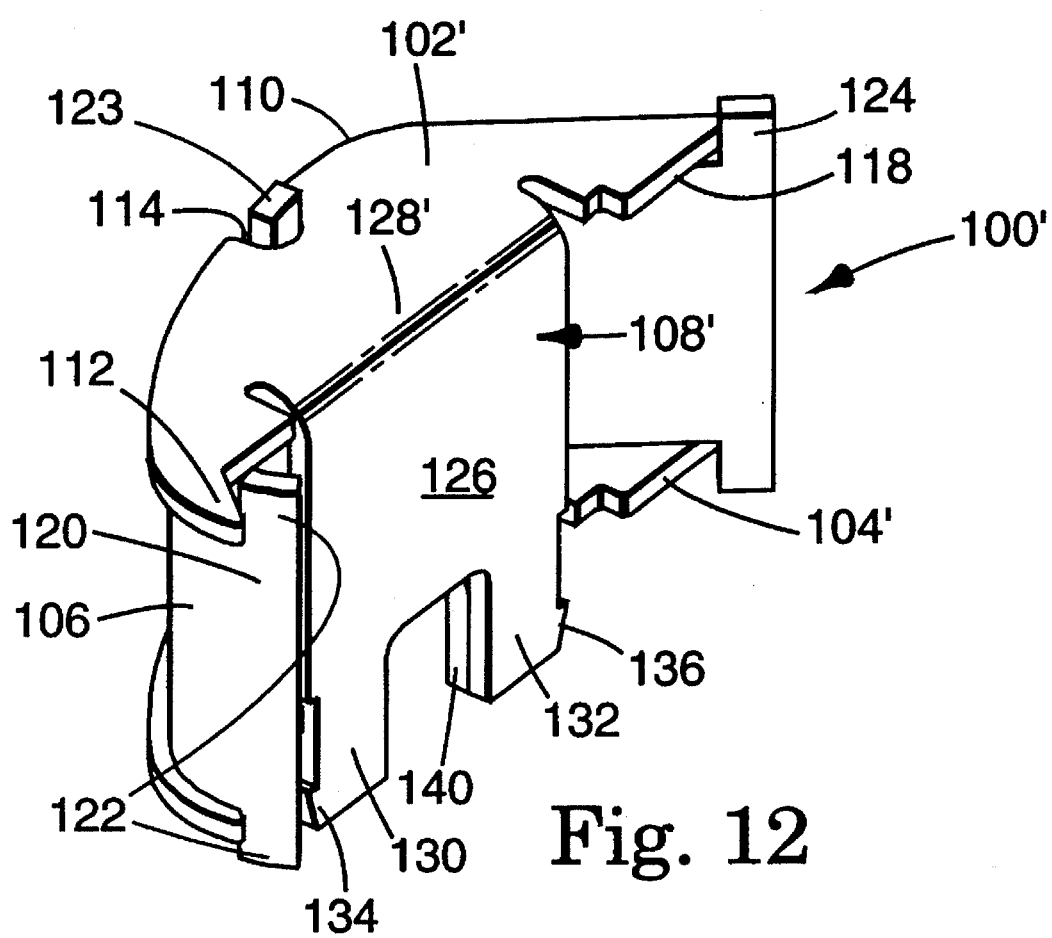
FIG. 12 is a perspective view of a modified version of the tape guide of FIG. 9.

In FIG. 12, the post 108' and the top flange piece 102' are formed as a single element, connected by the upper portion 128' with the post 108' bent at a right angle with the top flange piece 102'. Also, the bottom flange piece 104' has a flange 140 which is formed with the flange piece 104' and is bent at a right angle with the flange piece 104'. The flange 140 combines with the legs 130, 132 of the post 108' to help secure the tape guide 100' in the cartridge.

In the embodiment shown in FIG. 1, the tape guides have a sector-shaped body 88 with a curved tape bearing surface 90 and two unequal length planar surfaces 92, 94. The planar surface 92 that intersects the bearing surface 90 that is intended to be mounted in the tape cartridge 10 closer to the adjacent tape reel is longer than the other planar surface 94. This configuration improves the manufacturing process and facilitates fitting the tape guides into a tape cartridge.

The method of making the tape guides and assembling them in the base plate of cartridges includes several steps. First a continuous sheet of metal blank, which can be used to make several of the tape guide components, is maintained flat, such as by straightening. The metal blank is sheared to make a rectangular tape surface piece having top and bottom edges with projecting tabs set precisely in the top and bottom edges to define the vertical height of the tape guide. The metal blank is sheared to make a top flange piece and a bottom flange piece each with a curved edge and having notches. The tape surface piece is cold roll formed to a radius of curvature slightly lower than the predetermined final radius of curvature of the tape surface piece after assembly into a tape guide. A post is made and attached to the top and bottom flanges and the projecting tabs of the top and bottom edges of the tape bearing surface piece are interlocked with the corresponding notches of the top and bottom flange pieces. The tape surface piece acts as a spring that defines and holds together the tape guide. The convex surface of the tape surface piece to desired smoothness as a tape bearing surface.

The post can be made cylindrical by lathe turning to form a generally cylindrical body and successively smaller diameter generally cylindrical intermediate and end portions on each side. This tape guide can be mounted into a base plate of a cartridge by inserting the smallest end of the post in an opening in the base plate.

Alternatively, the post can be made generally flat by shearing a metal blank to make the post with a top portion with notches, a central portion with notches, and a bottom portion formed of two legs. Each leg can have a barb on the outside extending in opposite direction to the barb on the other leg. The post legs are inserted in corresponding openings in the base plate of the cartridge to secure and locate the tape guide in the plane of the base plate.

The flat post can be formed by shearing a metal blank as a contiguous part of the top flange and by bending the post at right angles to the flange to cold form the post as an extended portion of the sheared blank piece for the top flange. Additionally, at least part of the bottom portion of the post can be formed as a contiguous part of the bottom flange by bending the part of the bottom portion of the post at right angles to the flange in the same direction as the extended portion of the top flange to cold form the post as an extended portion of the sheared blank piece for the bottom flange. The extended portions of both flanges each include a pair of legs having a thickness half that of the assembled legs. The half thickness legs are joined together to form the completed legs.

The flat post 108 spring loads the flanges 102, 104 in the vertical plane against the tape surface piece 106 and prevents angular rotation of the tape guide 100 in the horizontal plane around the axis of the post. This eliminates the lathe turning step, the half shearing for the buttons on the flanges, and an extra bore in the base plate, as compared with cylindrical posts, as described below. When the post 108' is formed with the top flange piece 102' and the bottom flange piece 104' a fourth assembly part, the separate post, is eliminated.

Additionally, the tape guides 44, 45, 46, 100, 100' have a much larger radius of curvature than the guide pin 48. The surface area and roughness in combination with the larger radius tape guide, allow the tape 22 to travel past the guides with little contact with the bearing surface as the tape rides on a self-acting air film. The tape 22 actually lifts off of the guides 44, 45, 46 by at least one micron in some cases. This is measured using a photonic sensor such as an MTI 1000 Fotonic™ Sensor using a 3808 module made by Mechanical Technology Inc. The large radius provides a mechanism for hydrodynamic lift, as known from Reynolds equation, by creating a film of air under the tape 22 between the tape 22 and the tape guide. This is accomplished without resort to known systems such as air jets. This reduces the tape backside-to-tape guide friction, and reduces the drive force by up to 25 percent, thereby reducing the power dissipation. Preferably, the tape 22 will not contact the tape guides at all, although the tape is expected to contact the guides at some points during operation. It is sufficient to achieve the above advantages that the tape 22 not contact the tape guides along most of the circumference of the tape guides.

Similarly, the tape tracking is improved by up to 50 percent and there are no shuffle-induced speed variations when the tape guides 44, 45, 46, 100, 100' are used as shown in tests using 2.5 cm (1 in) diameter tape guides. Moreover, the range of tape tensions, the difference between the maximum and minimum tape tensions from the beginning of the tape to the end of the tape are reduced. This reduction obviates the need for tape wrap pins which need not be used. In tests comparing the frictional drive force of a single radius [0.27 cm (0.105 in) radius] tape guide with single radius [0.95 cm (0.375 in) radius], compound radius [1.27–0.64 cm (0.5–0.25 in) radius], and single radius [1.27 cm (0.5 in) radius] tape guides at various tape speeds, the large radius tape guides uniformly require lower frictional drive forces. The following frictional drive forces in Newtons were attained for the four tape guides at speeds of 0.76, 1.52, 2.29, and 3.05 meters per second (30, 60, 90, and 120 in per second), respectively:

|  | Tape Guide Radius (cm) | | | |
| --- | --- | --- | --- | --- |
| Tape Speed (m/s) | .27 | 0.95 | Compound | 1.27 |
|  | | Frictional Drive Force (N) | | |
| .76 | .42 | .30 | .25 | .19 |
| 1.52 | .44 | .22 | .12 | .08 |
| 2.29 | .47 | .21 | .10 | .08 |
| 3.05 | .44 | .14 | .08 | .06 |

Figure 2:
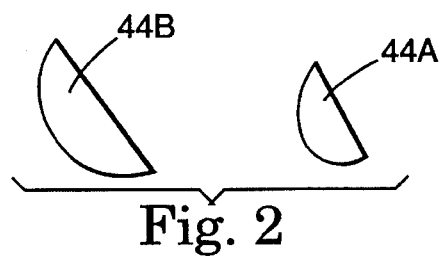
FIG. 2 is a comparison of a constant radius tape guide with a varying radius tape guide.

This larger radius of curvature can be constant, and be in the range of 0.6 cm to 1.27 cm. Alternatively, to compensate for the space limitations within the data cartridge 10, the radius of curvature can vary, for example varying from a larger radius at the ends to a smaller radius of 0.6 cm (0.25 in) in the middle, as shown in FIG. 1. As shown in FIG. 1, the two tape guides 44, 46 can have different shapes to accommodate the different space constraints of the data cartridge. The inflection points are blended together with a surface finished, for example, with a 3 micron lapping film such as 3M brand Imperial Lapping Film with 3 micron grade and a 1 mil backing. As shown in FIG. 2, the shape of the varying radius tape guide 44A is much smaller than that of the constant radius tape guide 44B. The varying radius can simply be a compound radius including three separate radii blended together or can be formed of curves such as ellipses or hyperbolas which have varying radii. In FIG. 2, the tape guide 44A represents a tape guide with a single 1.27 cm (0.5 in) radius and the tape guide 44B represents a tape guide with a radius that is 1.27 cm (0.5 in) at the ends and 0.6 cm (0.25 in) in the middle.

The larger radius at the ends provides the desired large radius effects at the entrance of the tape guide 44, 45, 46,

100, 100' for either tape direction. Although the radius in the middle of the tape guides is smaller, and although the air film requires a large radius to be entrapped, once the air film is entrapped in an air bearing due to a large radius, it will remain substantially entrapped regardless of subsequent smaller radius contours. Thus, the hydrodynamic lift is carried over the smaller radius portion to reduce the friction between the tape backside and the tape guide. Tests have confirmed that the varying radius tape guide attains similarly small frictional losses at the interface between the tape backside and the tape guide and that these losses are smaller than those attained with known tape guides having a 0.25 cm (0.1 in) radius.

Moreover, the large radius tape guides 44, 45, 46, 100, 100' whether of single or varying radius, and the flanges 96 create a long trough as the tape 22 enters the tape guide. The tape guides serve as a guiding surface which, as it is lengthened, reduces tape pack misregistrations. The long trough steers, guides, and aligns the magnetic tape before the tape passes the read/write head to prevent tape wandering, to improve the tape wrap on the reel, and to improve tape tracking. The trough also dampens the effects of the tape hubs in the tape tracking spectrum.

The surface finish of the tape guides 44, 45, 46, 100, 100' also can affect the performance of the cartridge 10, as different surface smoothness levels affects the level of air entrapment between the tape and the tape guide. If the finish is too rough the air film may not be entrapped. A surface finish that is too smooth could result in degraded drive force performance at low tape speeds. Tests have shown that tape guides made of Type 303 stainless steel with the bearing surface polished using lapping film with a diamond grit of 3 microns and having a surface finish, measured with a Taylor-Hobson Talysurf profilometer, ranging from 0.013 to 0.038 microns (0.5 to 1.5 microinches) in average roughness work well. Thus, if needed, the performance of the cartridge can be altered by selecting a tape guide radius or surface roughness to permit the desired level of air entrapment.

Various changes and modifications may be made in the invention. For example, although the 1.5 cartridge 10 components are discussed as being mounted on the base plate 12, they can be formed in the cover if desired.

We claim:

1. A method for production of a tape guide for tape cartridge comprising the steps of:

shearing a metal blank to make a top flange pieces and a bottom flange piece each with a curved edge and having notches and a thickness;

shearing a metal blank to make a rectangular tape surface piece having top and bottom edges which define, with the thickness of the flange pieces, the vertical height of the tape guide and having projecting tabs extending from the top and bottom edges;

cold roll forming the tape surface piece to a radius of curvature slightly lower than the predetermined final radius of curvature of the tape surface piece after assembly into a tape guide, wherein the surface piece, when curved, has a convex surface;

attaching a post to the top and bottom flanges;

interlocking the projecting tabs of the top and bottom edges of the tape surface piece with the corresponding notches of the top and bottom flange pieces wherein the tape surface piece acts as a spring that defines and helps hold together the tape guide;

polishing the convex surface of the tape surface piece to a desired smoothness as a tape bearing surface.

2. The method of claim 1 further comprising the step of locking the flange pieces against the tape surface piece to maintain contact between the tape surface piece and the flange pieces and to set a distance between the flange pieces.

3. The method of claim 1 further comprising the step of lathe turning to make the post having a generally cylindrical body at least one smaller diameter generally cylindrical end on both sides.

4. The method of claim 3 further comprising the step of mounting the assembled tape guide into a base plate of a cartridge by inserting one smaller diameter generally cylindrical end of the post in an opening in the base plate to assist in maintaining the tape guide perpendicular with the base plate and to assist in maintaining the height of the tape surface piece constant.

5. The method of claim 4, wherein the step of mounting the assembled tape guide comprises resting the tabs on the base plate to maintain the tape guide perpendicular with the base plate, to maintain the height of the tape surface piece constant, and to prevent the tape guide from wobbling.

6. The method of claim 1 further comprising the steps of:

shearing a metal blank to make a generally flat post having a top portion with notches, a central portion with notches, and a bottom portion formed of two legs each having a barb on the outside extending in opposite direction to the barb in the other leg; and inserting the post legs in corresponding openings in the base plate of the cartridge to secure and locate the tape guide in the base plate, to assist in maintaining the tape guide perpendicular with the base plate, to assist in maintaining the height of the tape surface piece, and to prevent angular rotation of the tape guide around the axis of the post.

7. The method of claim 6 wherein the shearing a metal blank to make a generally flat post step comprises forming the post as a contiguous part of the top flange by bending the post at right angles to the flange to cold form the post as an extended portion of the sheared blank piece for the top flange.

8. The method of claim 7 wherein the shearing a metal blank to make a generally flat post step further comprises:

forming part of the legs of the post as a contiguous part of the bottom flange by bending the part of the legs of the post at right angles to the flange in the same direction as the extended portion of the top flange to cold form the post as an extended portion of the sheared blank piece for the bottom flange, wherein the extended portions of both flanges each comprise a pair of legs having a thickness half that of the assembled legs; and joining the facing legs from the top and bottom flange pieces.

* * * * *

UNITED STATES PATENT AND TRADEMARK OFFICE
CERTIFICATE OF CORRECTION

PATENT NO.: 5,511,302

DATED: April 30, 1996

INVENTOR(S): Erickson et al.

It is certified that error appears in the above-identified patent and that said Letters Patent is hereby corrected as shown below:

Col. 9, line 40 "the 1.5 cartridge" should be --the cartridge--.

Col. 9, line 47, "pieces" should be --piece--.

Signed and Sealed this

Twenty-second Day of April, 1997

Attest:

BRUCE LEHMAN

Attesting Officer

Commissioner of Patents and Trademarks